Aug. 8, 1950 — C. B. FOWLER — 2,517,553
VARIABLE RESISTANCE WITHOUT CONTACTS
Filed Oct. 26, 1945 — 2 Sheets-Sheet 1

Inventor
CLARENCE B. FOWLER
By Ralph L. Chappell
Attorney

Aug. 8, 1950                C. B. FOWLER                2,517,553

VARIABLE RESISTANCE WITHOUT CONTACTS

Filed Oct. 26, 1945                2 Sheets-Sheet 2

Inventor
CLARENCE B. FOWLER
By Ralph L. Chappell
Attorney

Patented Aug. 8, 1950

2,517,553

UNITED STATES PATENT OFFICE 2,517,553

VARIABLE RESISTANCE WITHOUT CONTACTS

Clarence B. Fowler, Washington, D. C.

Application October 26, 1945, Serial No. 624,916

4 Claims. (Cl. 172—36)

(Granted under the act of March 3, 1883, as amended April 30, 1928; 370 O. G. 757)

My invention relates to electrical conductors and more particularly to electrical conductors adapted to change current flow without the use of moving contacts.

One of the principal disadvantages of the use of electricity is the fire hazard, wear, radio interference, and maintenance associated with moving current carrying contacts. This is particularly significant in the case of direct current systems where motors, generators, and induction devices require commutating mechanisms to provide reversal of current. In the case of D.-C. motors designed for hazardous locations the necessity of a commutator has required special motor structural design having airtight enclosures. In the case of motors designed for use on aircraft, the need for a commutator has caused considerable difficulty by reason of the loss of commutator finish at high altitudes. This problem has not yet been satisfactorily solved.

I have discovered that the above mentioned disadvantages of electrical commutators or switches can be avoided by the use of a resistance comprising a conducting liquid enclosed in a flexible tube. By mounting the ends of the tube in a solid housing and providing for a change in the pressure of the liquid within the tube, I am enabled to vary the resistance between the two ends without moving contacts of any type. I thereby achieve a variable resistance which is inherently safe for use in hazardous locations and which does not have the high maintenance and low reliability incident to the use of moving contacts.

In accordance with another aspect of my invention, my variable resistance is connected in a bridge circuit whereby a variable voltage or a variable current is obtained from a constant direct voltage source. This enables me to obtain an alternating current from a direct current source without the use of moving contacts of any kind.

In accordance with a further aspect of my invention the pressure of the liquid within my variable resistance is varied in accordance with the angular position of a shaft and the magnitude and direction of current applied to a motor thereby changed in accordance with shaft position. I therefore am enabled to produce a direct current motor without moving current carrying contacts.

Further, in accordance with my invention, my variable resistance is mounted on a helical core, thereby obtaining a variable magnetomotive force in accordance with the liquid pressure in the resistance.

In accordance with a further aspect of my invention, a resistance which varies in accordance with the current is achieved by using a helix composed of my variable resistance wound about a movable magnetic rod which in turn varies the liquid pressure within my resistance tube.

While my invention is susceptible of various modifications and alternative constructions, I have shown in the drawings and will herein describe in detail the preferred embodiments. It is to be understood, however, that I do not intend to limit the invention by such disclosure for I aim to cover all modifications and alternative constructions falling within the spirit and scope of the invention as defined in the appended claims.

Figure 1:
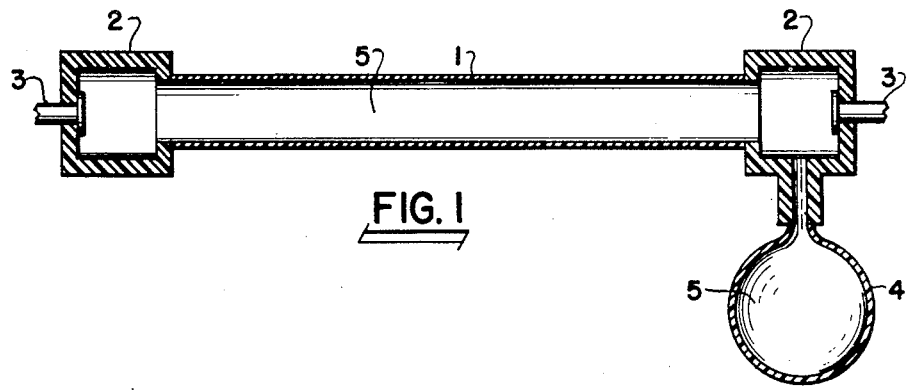
Figure 1 shows a cross-sectional view of my invention with the resistance at low liquid pressure.

Referring now to Figure 1. Tube 1 comprises a flexible tube constructed of expansible rubber-like material having end pieces 2 connected thereto. The end pieces 2 are of solid material having a chamber in liquid connection to the inner portion of tube 1. Contact members 3 are mounted within the rigid members 2 which may be securely anchored to any suitable stationary support thereby fixing the distance between these members. As a means of controlling liquid pressure, bulb 4 of flexible material is connected to one end 2. The complete structure is filled with a conducting liquid such as mercury.

Figure 2:
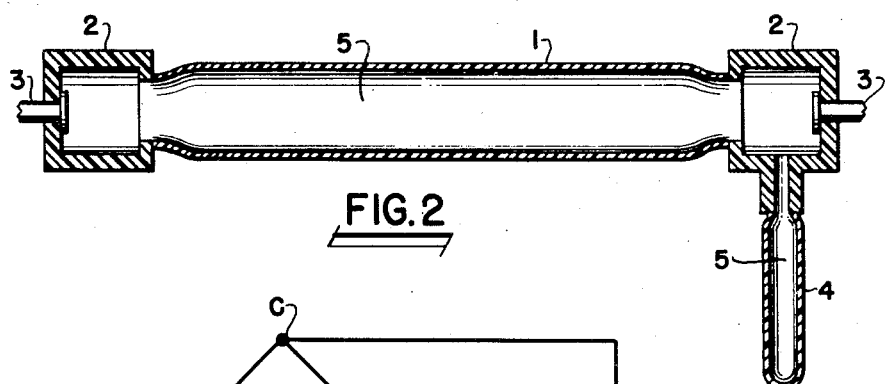
Figure 2 shows a cross-sectional view of my invention at high liquid pressure.

Figure 1 shows the variable resistance for the low pressure, high resistance, condition wherein tube 1 is unflexed and the cross-section of liquid 5 is small throughout the entire length of the tube. Figure 2 shows my variable resistor for the high pressure, low resistance, condition. In this case bulb 4 is nearly collapsed while flexible tube 1 has become much thicker. The average area of the conductor 5 throughout the length of the tube 1 in this case is much greater than as shown in Figure 1 and a correspondingly smaller value of resistance is produced between conductors 3.

It will be evident to those skilled in the art that any method of varying the pressure within tube 1 will act to vary the resistance of the complete unit. As shown in Figures 1 and 2 a bulb is utilized for this purpose by reason of its convenience for hand operation. Other methods, such as a mechanical pump or a bellows, may be used.

Figure 3:
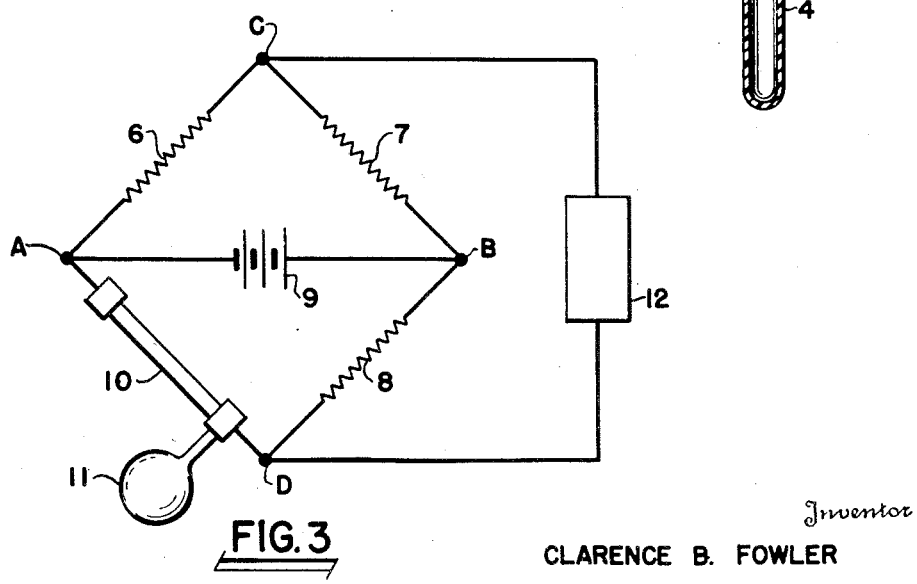
Figure 3 shows a Wheatstone bridge circuit by which my resistor is enabled to cause a variation in the magnitude and direction of current flow.

Referring now to Figure 3 which shows a method whereby my variable resistance may be used to generate alternating voltage from any suitable direct current source, such as for example the battery 9, connected to points A—B of Wheatstone bridge ACBD and the load circuit 12 connected to points C and D. The Wheatstone bridge consists of bridge arms 6, 7, 8, and 10. The bridge arm AD consists of variable resistance 10 constructed in accordance with the above discussed principles and actuated by bulb 11. When the ratio of the resistance of 10 to resistance 8 is greater than the ratio of resistance 6 to resistance 7, current flow through load 12 will flow in the same direction as when load 12 is connected to points A and B of the bridge, point D being connected to point B and point C being connected to point A. On the other hand, if the resistance of resistor 10 is such that the ratio of resistance 10 to that of resistance 8 is less than the ratio of resistance 6 to resistance 7 the direction of current flow through load 12 will be in the opposite direction. Hence, by varying the pressure in resistance 10 (by operation of bulb 11) the direction and magnitude of current flow through load 12 is changed.

As an alternative to the construction shown in Figure 3, a second variable resistance constructed in accordance with my invention may be placed in bridge arm of C—B of Figure 3 in place of fixed resistance 7. If the bridge is balanced with the two variable resistances in the condition of no pressure, pressing the bulb of one resistance will cause current flow through load 12 in one direction and pressing the other bulb will cause current to flow through load 12 in the opposite direction.

Figure 4:
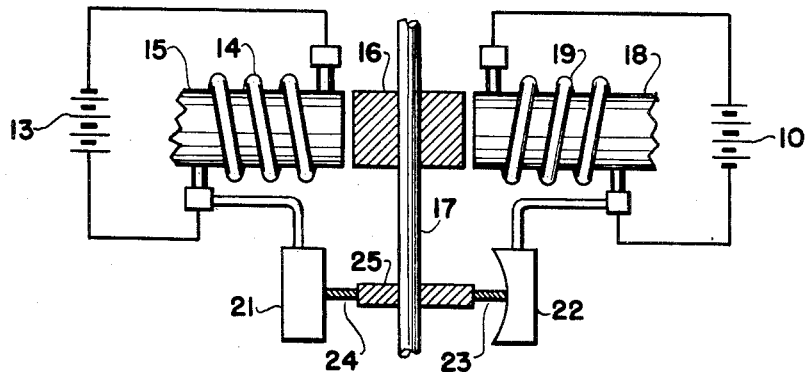
Figure 4 shows a plan view and partial cross-section of a motor adapted to utilize my resistance.

Figure 4 shows in a partial cross-section the plan of a direct current motor utilizing the principles of my invention. In the figure, 17 is a shaft, 25 is a cam connected thereto and 16 is the rotor of the motor. The latter element may comprise a group of permanent magnets. Elements 15 and 18 are field poles for the motor having coils 14 and 19 respectively. A magnetic structure (not shown) connects these poles in the usual manner. These coils comprise flexible resistance elements such as shown in Figure 1 except that they are mounted about the poles to produce magnetomotive force when current flow takes place. Coils 14 and 19 are connected to batteries 13 and 20 respectively. The liquid in coils 14 and 19 is contained within the coils themselves and to diaphragms 21 and 22 respectively so that pressure on either of these diaphragms alters the resistance of the corresponding coils. Members 23 and 24 coact with cam 25 to press diaphragms 22 and 21 respectively so that for every position of cam 25 there is a corresponding position of the two diaphragms, pressure in the two coils, resistance of the two coils, and magnetomotive force in the magnetic structure.

Figure 5:
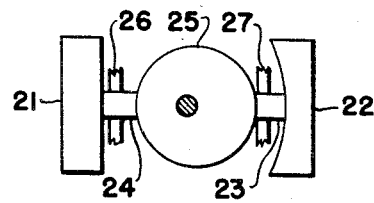
Figure 5 shows an axial cross-section of the cam used in the motor of Figure 4.

Figure 5 is an axial section of my motor as shown in Figure 4. The cam 25 is shown as an elliptical section although other shapes may be used. Guides 26 and 27 control the motion of members 24 and 23 respectively so that rotation of cam 25 alternately increases the pressure within diaphragms 21 and 22.

When cam 25 is in a position such that diaphragms 21 and 22 are compressed to an equal degree, the resistance of coil 14 is equal to the resistance of coil 19 and equal currents from batteries 13 and 20 flow through the two coils. In this case the magnetomotive force from coil 14 is equal and opposite to the magnetomotive force of coil 19 and no flux is produced in the magnetic structure by these coils. On the other hand, when cam 25 is in a position such that diaphragm 22 is compressed and diaphragm 21 permitted to expand, coil 14 has a higher resistance than coil 19 and a correspondingly greater magnetomotive force is produced by coil 19 than by coil 14. In this case a net magnetomotive force acts through the magnetic circuit and flux is produced, thereby causing rotation of rotor 16. If the cam 25 causes diaphragm 21 to be compressed to a greater degree than diaphragm 22, the reverse action takes place and more current flows through coil 14 than coil 19. In this case the magnetomotive force of coil 14 exceeds that of coil 19 and a flux in the opposite direction is produced. This causes a corresponding rotation of rotor 16.

By shaping cam 25 in accordance with the disposition of the magnets on rotor 16 and poles 15 and 18, I am enabled to cause changes in magnetomotive force which produce flux always acting to cause rotor 16 to turn in a desired direction. The motor then always rotates in the same direction and, by proper proportioning of cam 25, it is possible to cause a uniform motor torque.

It is evident that the operation of my motor as shown in Figures 4 and 5 is accomplished without the use of sliding contacts of any kind. The entire system is hermetically sealed and introduces no possibility of sparking. Furthermore, the absence of sliding current carrying contacts avoids the problems associated with the use of commutators at high altitudes.

Figure 6:
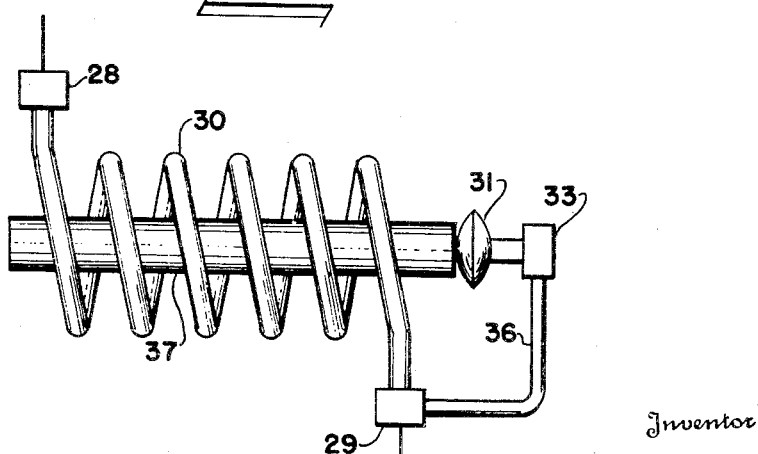
Figure 6 shows a current sensitive solenoid utilizing my invention.

An embodiment of my invention for use as a current sensitive resistance is shown in Figure 6. In the figure, coil 30 comprises a tube of flexible material similar to that of Figure 1. End connections 28 and 29 of coil 30 constitute the terminals of the resistance. End 29 of coil 30 is connected by passage 36 to reservoir 33 and reservoir 33 is connected to diaphragm 31. Plunger 37 is a permanent magnet adapted to compress diaphragm 31 in accordance with the flux produced by coil 30.

Operation of my device as shown in Figure 6 is as follows:

When current through coil 30 increases sufficiently, it repels permanently magnetized solenoidal core 37 so as to compress diaphragm 31, causing the latter to propel the excess of conductive fluid through 33 and 36 into coil 30, thereby increasing the cross-section of the rubber tubing and decreasing the resistance of the coil. This results in a steadily increasing pressure against 31 until the mechanical limit of its flexing is reached. Thus, a relatively minor increase in current can be automatically magnified into a larger current flow, without the use of contacts.

Figure 6 thereby achieves a resistance which decreases in value with current flow in one direction but is constant in value as to current flow in the reverse direction.

The invention described herein may be made and used by or for the Government of the United States for governmental purposes without the payment to me of any royalties thereon or therefor.

My invention is capable of wide variation from the forms illustrated and described, its scope being defined in the appended claims.

I claim:

1. In an electric motor, a shaft, a magnet pole, a coil wound about said pole, said coil comprising a tubular expansible container of fixed length, conducting liquid substantially filling said container, a diaphragm-operated pressure chamber in liquid connection with said container and a cam means on said shaft actuating said diaphragm.

2. A current sensitive resistance comprising a coil composed of a tubular expansible container containing an electro-conducting liquid, voltage terminals closing the ends of said coil, a permanent magnet contained within said coil and in operative engagement with an expansible diaphragm and a reservoir mounted at one end of said magnet and in liquid connection with each other and with said coil, whereby said resistance is adapted to decrease in value with current flow in one direction and to remain constant in value with current flow in the reverse direction.

3. In an electric motor, the combination of a shaft, a rotor on said shaft, a cam secured to said shaft, a pair of field cores on diametrically opposite sides of said rotor, a tube of predetermined fixed length arranged in a coil about each of said cores, end pieces closing the ends of said tubes, a source of electrical energy connected across the end pieces of each said tubes for supplying current therethrough, a pair of variable pressure chambers on diametrically opposite sides of said cam, conduit means between each said pressure chamber and an end piece, respectively, of said tubes, electro-conductive material substantially filling said pressure chambers, conduit means, tubes and end pieces, and cam followers between said cam and said variable pressure chambers for alternately varying the effective volume of said chambers, to thereby cause variations in the cross sectional area of said coils for alternately varying the flux density through said cores thereby obtaining a resultant thrust to rotate said rotor.

4. In an electric motor, the combination of a shaft, a rotor on said shaft, a pair of field cores on diametrically opposite sides of said rotor, an elongated container of predetermined fixed length arranged in a coil about each of said cores, a source of electrical energy connected across each of said containers for supplying current therethrough, a pair of variable pressure chambers each having a diaphragm, conduit means between each of said pressure chambers and each of said coils, electro-conductive material substantially filling said pressure chambers, conduit means and containers, and means driven by said shaft for alternately actuating each of said diaphragms.

CLARENCE B. FOWLER.

REFERENCES CITED

The following references are of record in the file of this patent:

UNITED STATES PATENTS

| Number | Name | Date |
|---|---|---|
| 1,428,834 | Bjerre | Sept. 12, 1922 |
| 1,748,927 | Kremer | Feb. 25, 1930 |
| 2,061,863 | Wells | Nov. 24, 1936 |
| 2,131,758 | Rypinski | Oct. 4, 1938 |
| 2,164,728 | Wey | July 4, 1939 |
| 2,316,008 | Ludbrook | Apr. 6, 1943 |
| 2,359,085 | Chubb | Sept. 26, 1944 |
| 2,391,966 | Harrison | Jan. 1, 1946 |

FOREIGN PATENTS

| Number | Country | Date |
|---|---|---|
| 70,025 | Germany | July 28, 1923 |